June 28, 1960  F. T. IRGENS  2,942,599
RATCHET DRIVE WITH AUTOMATIC PAWL ENGAGEMENT AND
AN ENGINE STARTER INCORPORATING SAID DRIVE
Filed July 25, 1956  2 Sheets-Sheet 2

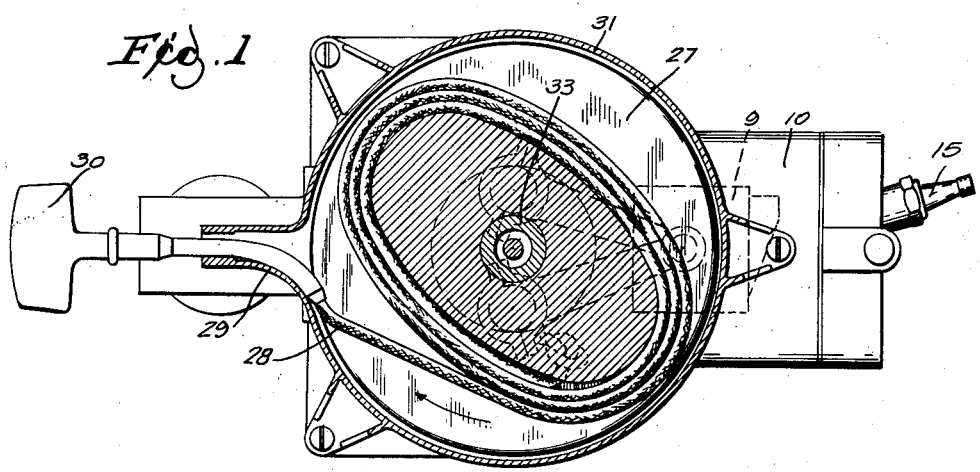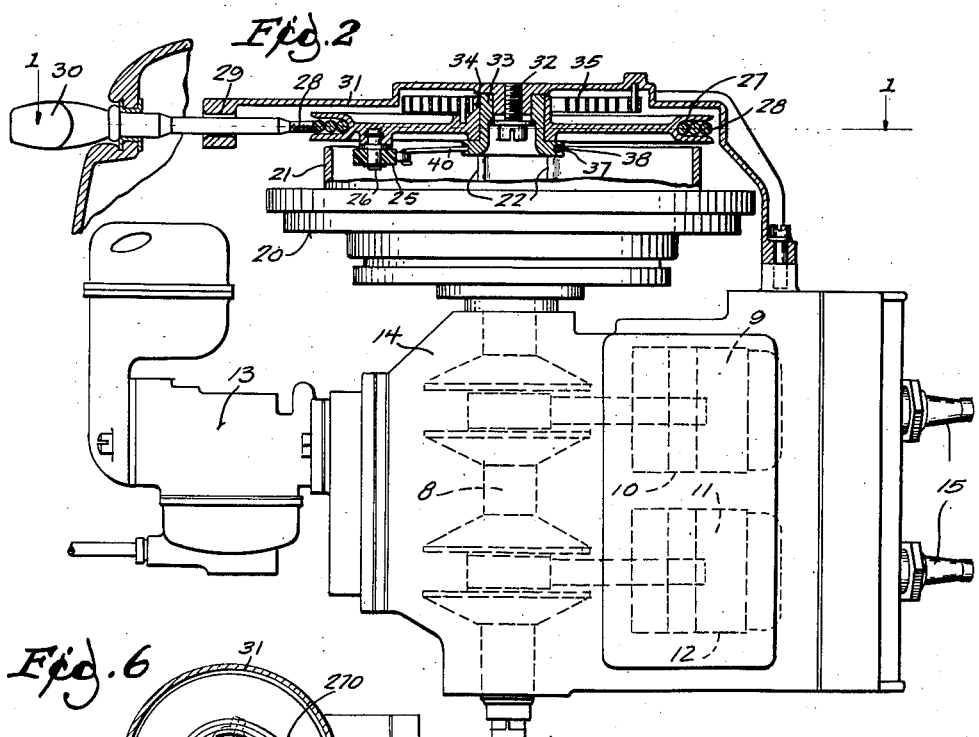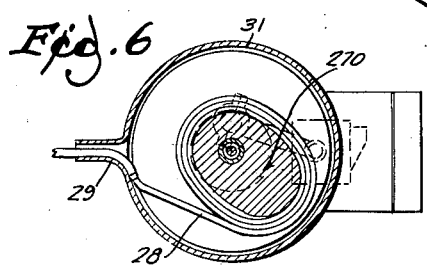

INVENTOR.
FINN T. IRGENS
BY
Wheeler, Wheeler & Wheeler
ATTORNEYS

United States Patent Office 2,942,599
Patented June 28, 1960

2,942,599
RATCHET DRIVE WITH AUTOMATIC PAWL ENGAGEMENT AND AN ENGINE STARTER INCORPORATING SAID DRIVE

Finn T. Irgens, Wauwatosa, Wis., assignor to Outboard, Marine & Manufacturing Company, Waukegan, Ill., a corporation of Delaware Filed July 25, 1956, Ser. No. 600,103

14 Claims. (Cl. 123—185)

This invention relates to a ratchet drive with automatic pawl engagement and an engine starter incorporating said drive.

The invention is applicable to engines of various types but has particular application to two-cycle engines. The starter selected to exemplify the invention is of a type in which the starting rope is normally wound on the starting pulley, being rewound following every starting operation by a torsion spring acting on the pulley.

The pulley is desirably mounted substantially coaxially with the engine starting wheel, which is usually its fly wheel and is provided with tooth means for pawl engagement. A stationary stud or boss which supports the pulley also provides frictional bearing support for a pawl actuating shoe which, in the initial movement of the starting pulley in either direction pivots the starting pawl upon the stud which supports it from the pulley, whereby the pawl is automatically activated impositively to and from operative position.

When the pulley is operated in a starting direction, the pawl is oscillated into a position for engagement with teeth on the engine starting wheel. The teeth may be conveniently located on the fly wheel rim and there need only be one or two teeth in each of the rim portions which are normally opposite the pawl when the starting pulley is in its retracted position and the engine is at rest.

In order that the pawl may be sharply oscillated to its operative position, and in order to provide for quick acceleration of the engine crankshaft for starting purposes, the starting pulley desirably provides varying radius. The rope is drawn from a small radius portion of the pulley in the initial rotation thereof, since the engine ports are open and there is little back pressure at this point. As the piston or pistons approach positions of maximum compression, the radius of the starting pulley increases so that the starting cord has maximum mechanical advantage at or near the position of top dead center of the pistons, this being the point of maximum resistance.

In the drawings:

Fig. 1 is a view in horizontal section taken on the line 1—1 of Fig. 2.

Fig. 2 is a view showing an engine side elevation, portions thereof being broken away through a fore and aft vertical section.

Fig. 6 is a view somewhat similar to Fig. 1 showing a form of starting pulley adapted for use in connection with a single cylinder engine.

Figure 3:
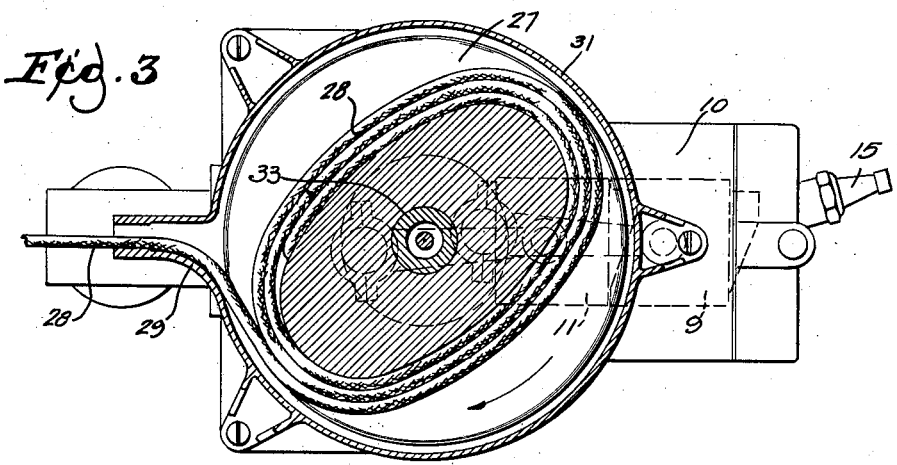
Fig. 3 is a view similar to Fig. 1 showing the starting pulley rotated about 100° from the position of rest.

The engine shown in Figs. 1 to 3 is of a conventional type known as an alternate firing engine, the crankshaft 8 having its crank offset 180° so that the piston 9 is moving outwardly in cylinder 10 while the piston 11 is moving inwardly in cylinder 12. In each cylinder in succession, mixture supplied by the carburetor 13 is delivered into the crank case 14 and fired by appropriate spark plug 15 at or near the top dead center position of the piston.

At the upper end of the crankshaft 8 is mounted a flywheel 20 which, among other functions, may serve the purpose of an engine starting wheel. To this end, the fly wheel rim 21 is provided at each of diametrically opposite points with one or two teeth at 22, the arrangement being such that, each time the engine comes to rest, at least one tooth will be provided in proximity to the normal position of the starting pawl hereinafter described. Normally, the position of rest in which the fly wheel rim 21 is illustrated in Fig. 4 is slightly in advance of the location of the pawl.

The starting pawl 25 is pivotally mounted for oscillation on a stud 26 carried by the starting pulley 27. This pulley may be elliptical in the sense that it has an elliptical rope channel between otherwise circular flanges as shown in Figs. 1, 4 and 5, this being the desired form of the pulley for use with an alternate firing engine. If the engine has but a single cylinder, or if the two cylinders fire concurrently, the pulley may have the form indicated at 270 in Fig. 6, being eccentrically provided with only one portion of increased radius.

The starting rope 28 is wound on the pulley as clearly shown in Figs. 1, 2 and 3 to pass two or three times about its perimeter in the channel with which the pulley is provided. The end of the rope is carried tangentially from the pulley through the guide opening 29 and is provided with a handle 30. The guide 29 is formed in the starter housing 31. Connected to the housing 31 by appropriate means such as the cap screw 32 is a bearing post 33 upon which the hub portion 34 of the pulley is mounted for rotation. A torsion spring 35 is anchored to the shroud and to the pulley in the manner clearly shown in Fig. 2 and rewinds the starting cord 28 on the pulley after each operation.

Figure 4:
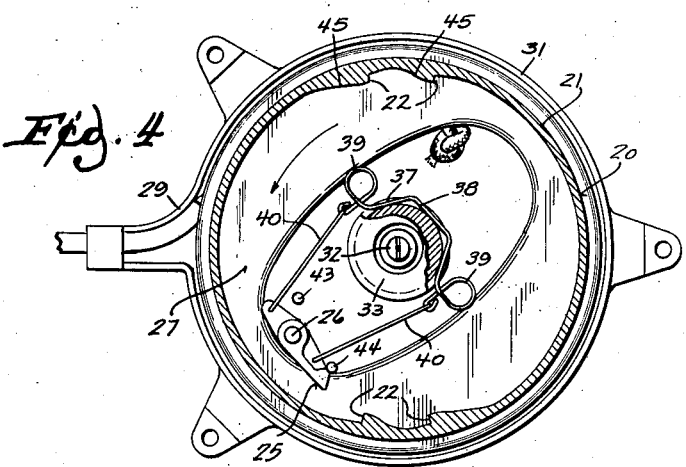
Fig. 4 is an inverted plane view of the starting pulley, the fly wheel rim being shown in horizontal section.
Figure 5:
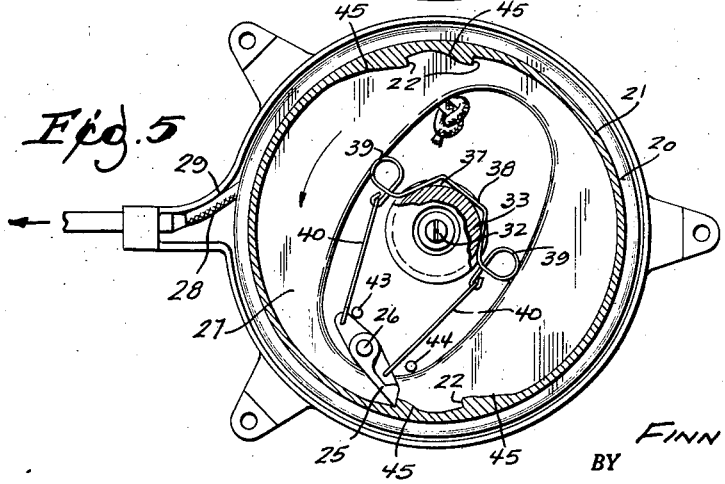
Fig. 5 is a view similar to Fig. 4 showing the parts in a slightly advanced position.

The bearing boss 33 has a peripheral groove at 37 in which there is disposed a friction shoe 38 which may comprise a piece of spring wire having spring loops at 39 connected under tension by links 40 with the opposite ends of pawl 25 in the manner clearly shown in Figs. 4 and 5.

The starting wheel is so fixed to the crankshaft 8 that when the pistons 9 and 11 come to rest, one above the other, as they tend to do following the engine operation, the tooth means thereof will be just ahead of the pawl on the pulley. The starting pulley will normally come to rest in the position shown in Fig. 1, the portion of the cord 28 leading to the handle 30 coming off the pulley approximately in its position of minimum radius when the handle is seated as shown in Fig. 1. The maximum diameter of the starting pulley rope channel will lie about 100° short of top dead center when the starting pawl 25 on the under side of the pulley is in its normal retracted position shown in Fig. 4, lying sufficiently far behind the proximate teeth 22 of the fly wheel so as to assure engagement as the starting pawl oscillates into its active position upon the initial movement of the pulley.

Oscillation of the starting pawl is effected by the initial pulley movement because of the drag of the spring wire shoe 38 in the groove 37 of the stationary bearing member 33. Accordingly, as soon as there is a pull on the starting rope, the pawl oscillates from the position of Fig. 4 to the position of Fig. 5 and will usually engage the first tooth provided in the fly wheel rim 21. The second tooth 22 is usually unneeded. It is provided merely as a precautionary measure.

Initial pull on the starting rope produces relatively rapid acceleration of crankshaft 8 and pistons 9 and 11. In this position of the parts, there is little or no compression on the piston and advantage is taken of this fact to get the parts into rapid motion before high resistance to rotation is developed.

As tension on the starting rope is continued, one of the pistons compresses a charge in the crank case while the other compresses a charge in its respective cylinder. Accordingly, resistance to movement of the starting pulley increases rather rapidly. In order to facilitate starting, the starting rope 28 is drawn from portions of the pulley perimeter which are of progressively increasing radius thereby giving the operator increasing mechanical advantage to deal with the increasing compression. The arrangement is desirably such that the rope is drawn from portions of the pulley which are of maximum radius at about the time firing occurs which may be, for example, about 9° in advance of top dead center. The single cylinder engine shown in Fig. 6 operates in the same manner.

As soon as the starting cord is released by the operator, the torsion spring 35, in which energy has been stored during the starting operation, commences to rewind the cord on the pulley. The very first movement of the pulley in a rewinding direction with respect to the stationary bearing member 33 causes the drag of shoe 38 to function oppositely for the retraction of the pawl 25 from the operative position of Fig. 5 to the retracted position of Fig. 4. The operative position is defined by a stop 43 and the retracted position by a stop 44, with which the pawl 25 becomes alternately engaged during movement of the parts as above described.

While the pawl is actuated by means of the friction shoe from retracted to advanced position and vice versa, this actuation is dependent on relative movement between the starting pulley and the fixed bearing member. In the event that the operator inadvertently retains his pull on the starting cord after the engine operation has commenced, the relatively long bevelled surfaces 45 of the starting wheel teeth 22 will thrust the pawl inwardly out of engagement with the fly wheel so that no damage will be done. Apart from the great reduction in weight effected by the elimination of most of the driven teeth 22, there is an advantage in having a reduced number of teeth in that there will be minimum contact between the pawl and the teeth in the event of overrun and improperly continuing tension on the starting pulley.

It will be noted that the friction shoe 38 engages the stationary mounting member 33 at only three points spaced at approximately 60° around the periphery thereof. The shoe, being preferably made of spring wire, provides its own tension. It is not only simple and economical to manufacture, but takes care of tension as well as friction and at the same time is remarkably free of wear.

I claim:

1. The combination with a driven part and a driving part on which a pawl is pivoted, the said parts being at least approximately coaxially mounted for rotation and the pawl being pivotally movable to and from a position for engagement with the driven part, of a fixed bearing member, a shoe in frictional engagement with the bearing member and link means immediately connecting the shoe with the pawl whereby upon actuation of the driving part the drag of the shoe on the bearing member will oscillate the pawl upon movement of the driving part respecting the bearing member.

2. The combination with a driven part and a driving part on which a pawl is pivoted, the said parts being at least approximately coaxially mounted for rotation and the pawl being pivotally movable to and from a position for engagement with the driven part, of a fixed bearing member, a shoe in frictional engagement with the bearing member and link means positively connecting the shoe with the pawl whereby the drag of the shoe on the bearing member will oscillate the pawl upon movement of the driving part respecting the bearing member, the bearing member having an arcuate bearing surface and the link means comprising links extending from said shoe at opposite sides of the bearing surface to opposite ends of the pawl, the pawl being pivoted intermediate its ends.

3. The device of claim 2 in which the shoe comprises a piece of spring stock having terminal portions projecting away from said bearing surface and with which the links are connected under tension holding the shoe to the bearing surface.

4. The device of claim 3 in which the relatively fixed bearing member comprises a boss having a peripheral groove providing said bearing surface, the spring stock comprising spring wire disposed in said groove.

5. The device of claim 4 in which the spring wire comprises a plurality of sections in substantial point contact with respective portions of the groove and beyond which the spring wire is formed with loops outside of the groove to which the links are connected.

6. The combination with driving and driven members substantially coaxially mounted for rotation, the driven member being provided with tooth means, a pawl pivoted intermediate its ends to the driving member, a fixed bearing boss adjacent the driving member and provided with a bearing surface, a shoe frictionally engaged with the bearing surface of said boss, and tension links connecting opposite ends of the shoe at opposite sides of the boss to opposite ends of the pawl.

7. The device of claim 6 in which the driving member comprises a pulley having a starting rope wound thereon, the said pulley having a rope-receiving channel varying in radius with respect to the pulley axis, the rope leaving the pulley approximately tangentially from a relatively small radius portion of the channel in a normal stationary position of the driving member in which the pawl is retracted from a position for tooth engagement, initial movement of the driving member under tension of the rope being adapted to effect relatively high speed rotation of the driving member and correspondingly high speed oscillation of the pawl to a position for engagement with said tooth means, continuing rotation of the driving member being adapted to deliver rope from channel portions of increased radius, whereby to give increased mechanical advantage in the actuation of the driven member following engagement of said pawl with tooth means thereof.

8. The device of claim 6 in which the driving member and the driven member are both provided with means defining a normal position of rest, the said tooth means being of limited extent and disposed substantially solely to receive pawl contact at said position.

9. A recoil type engine starter comprising the combination with an engine starting wheel having tooth means, of a substantially coaxial starting pulley provided with pintle means upon which a pawl is pivotally mounted intermediate the ends of the pawl, the pawl being movable on said pintle means to and from a position for engagement of the tooth means of the starting wheel, a starting rope wound on the pulley and provided with a handle, a spring connected with the pulley to rewind the rope thereon, a fixed bearing boss having a bearing surface substantially coaxial with the pulley, a shoe in frictional engagement with the surface, tension links holding the shoe to the surface and connecting its ends at opposite sides of the boss with the ends of the pawl at opposite sides of the pintle means for effecting oscillation of the pawl upon movement of the pulley respecting the boss.

10. The device of claim 9 in which the pulley has a channel of varying radius in which the rope is wound, the pulley and starting wheel having normal positions of rest and the rope having means guiding it approximately tangentially from a small radius portion of the pulley channel when the pulley is in its position of rest, the tooth means of the wheel lying slightly in advance of the pawl in the said positions of the pawl and wheel.

11. The device of claim 9 in which the shoe comprises spring wire, the bearing surface of the boss comprising a channel in which the wire is disposed and at least one end of the wire comprising a resilient portion with which one of the links is connected to maintain the links under tension.

12. The device of claim 11 in which both ends of the wire shoe comprise coils to which the respective links are connected, the respective coils being resiliently biased by the connection.

13. In a starter, the combination with a driving member and a peripherally toothed driven member, said members being mounted for substantially coaxial rotation, of a friction surface extending about the axis of rotation, a pawl pivoted to the driving member and having both ends normally in immediate proximity to the toothed periphery of the driven member and in a normally retracted position from which the one of said ends moves about the pivot of the pawl to engagement with a tooth of the driven member, a shoe mounted for rotation about said axis and frictionally engaged with said surface for normal restraint against such movement, and a link pivotally connected with said shoe and pivotally connected with said pawl, relative movement between the driving member and said shoe effecting pivotal movement of said pawl in a direction to engage its said one end with a tooth of the driven member, and relative movement in an opposite direction between the driving member and the shoe tending to withdraw said one end of the pawl from engagement with said tooth of the driven member.

14. In a starter, the combination with a driving member and a peripherally toothed driven member, said members being mounted for substantially coaxial rotation, of a friction surface extending about the axis of rotation, a pawl pivoted to the driving member and having both ends normally in immediate proximity to the toothed periphery of the driven member and in a normally retracted position from which the one of said ends moves about the pivot of the pawl to engagement with a tooth of the driven member, a shoe mounted for rotation about said axis and frictionally engaged with said surface for normal restraint against such movement, and a link pivotally connected with said shoe and pivotally connected with said pawl, relative movement between the driving member and said shoe effecting pivotal movement of said pawl in a direction to engage its said one end with a tooth of the driven member, and relative movement in an opposite direction between the driving member and the shoe tending to withdraw said one end of the pawl from engagement with said tooth of the driven member, in further combination with a second link connecting the shoe with the pawl, the said links being disposed at opposite sides of said axis and connected with said pawl at opposite sides of its pivotal connection with the driving member.

References Cited in the file of this patent

UNITED STATES PATENTS

| | | |
|---|---|---|
| 125,391 | Hills | Apr. 9, 1872 |
| 1,067,257 | Kenyon et al. | July 15, 1913 |
| 1,132,160 | Casgrain | Mar. 16, 1915 |
| 1,490,954 | Bell | Apr. 22, 1924 |
| 1,622,289 | Nelson | Mar. 29, 1927 |
| 2,168,998 | Lindenberg | Aug. 8, 1939 |
| 2,227,392 | Kunmitz | Dec. 31, 1940 |
| 2,266,865 | Herrington | Dec. 23, 1941 |
| 2,597,334 | Johnson et al. | May 20, 1952 |
| 2,692,589 | Watkins | Oct. 26, 1954 |
| 2,848,987 | Morden | Aug. 26, 1958 |
| 2,868,186 | Schnacke | Jan. 13, 1959 |

FOREIGN PATENTS

| | | |
|---|---|---|
| 879,008 | France | Nov. 2, 1942 |
| 272,056 | Switzerland | Feb. 16, 1951 |

UNITED STATES PATENT OFFICE
CERTIFICATE OF CORRECTION

Patent No. 2,942,599

June 28, 1960

Finn T. Irgens

It is hereby certified that error appears in the above numbered patent requiring correction and that the said Letters Patent should read as corrected below.

In the grant, lines 1 to 3, for "assignor to Outboard, Marine & Manufacturing Company, of Waukegan, Illinois, a corporation of Delaware," read -- assignor to Outboard Marine Corporation, a corporation of Delaware, --; line 12, for "Outboard, Marine & Manufacturing Company, its successors" read -- Outboard Marine Corporation, its successors --; in the heading to the printed specification, lines 5 to 7, for "assignor to Outboard, Marine & Manufacturing Company, Waukegan, Ill., a corporation of Delaware" read -- assignor to Outboard Marine Corporation, a corporation of Delaware --.

Signed and sealed this 29th day of November 1960.

(SEAL)
Attest:

KARL H. AXLINE
Attesting Officer

ROBERT C. WATSON
Commissioner of Patents